United States Patent [19]

Wells

[11] Patent Number: 5,006,060

[45] Date of Patent: Apr. 9, 1991

[54] GAS RESONANCE DEVICE

[75] Inventor: Alan A. Wells, Ely, England

[73] Assignee: Haser Company Limited, Inverness, England

[21] Appl. No.: 531,732

[22] Filed: Jun. 1, 1990

Related U.S. Application Data

[63] Continuation of Ser. No. 398,306, Aug. 25, 1989, Pat. No. 4,948,360, which is a continuation of Ser. No. 117,783, Nov. 6, 1987, abandoned.

[30] Foreign Application Priority Data

Nov. 6, 1986 [GB] United Kingdom ............... 8626562

[51] Int. Cl.$^5$ ............................................ F23C 11/04
[52] U.S. Cl. ............................................ 431/1; 60/249
[58] Field of Search ..................... 431/1; 60/247–249

[56] References Cited

U.S. PATENT DOCUMENTS

| | | | |
|---|---|---|---|
| 2,621,718 | 12/1952 | Krautter et al. | 431/1 |
| 2,653,654 | 9/1953 | Kamm et al. | 431/1 |
| 2,717,637 | 9/1955 | Huber | 431/1 |
| 3,267,986 | 8/1966 | Olsson | 431/1 |
| 3,545,211 | 12/1970 | Harp | 60/39.77 |
| 3,690,807 | 9/1972 | Paxton et al. | 431/1 |
| 3,819,318 | 6/1974 | Pearson | 431/1 |
| 4,650,413 | 3/1987 | Olsson et al. | 431/1 |
| 4,706,390 | 11/1987 | Kitchen | 431/1 |
| 4,747,771 | 5/1988 | Goodfellow | 431/1 |

FOREIGN PATENT DOCUMENTS

| | | |
|---|---|---|
| 1035841 | 8/1958 | Fed. Rep. of Germany . |
| 189686 | 6/1984 | Sweden . |
| 233945 | 12/1944 | Switzerland . |
| 731181 | 4/1980 | U.S.S.R. . |

Primary Examiner—Carroll B. Dority
Attorney, Agent, or Firm—Sughrue, Mion, Zinn, Macpeak & Seas

[57] ABSTRACT

A thermally driven gas resonance device includes a resonance tube (3) which expands in cross-section along its length from one end to the other, a heat source (2) located at the one end of the resonance tube, and an igniter (14) to trigger oscillations in a gas in the tube. The heat source (2) is preferably a pulsed heat source having a repetition frequency corresponding to a resonant frequency of the gas tube (3). The mechanical energy produced in the oscillating gas may be used to operate a pressure swing gas separator by including a bed (16) of molecular sieve material in the other end of the tube (3). Alternatively, the mechanical energy may be used to drive a heat pump (19). In this case a heat sink (21) is located at the other end of the tube (3), a regenerator (20) is also located adjacent the other end, and ports (8) on the side of the regenerator (20) towards the heat source (2) effect heat exchange between the gas in the resonance tube (3) and a source of low grade heat.

3 Claims, 6 Drawing Sheets

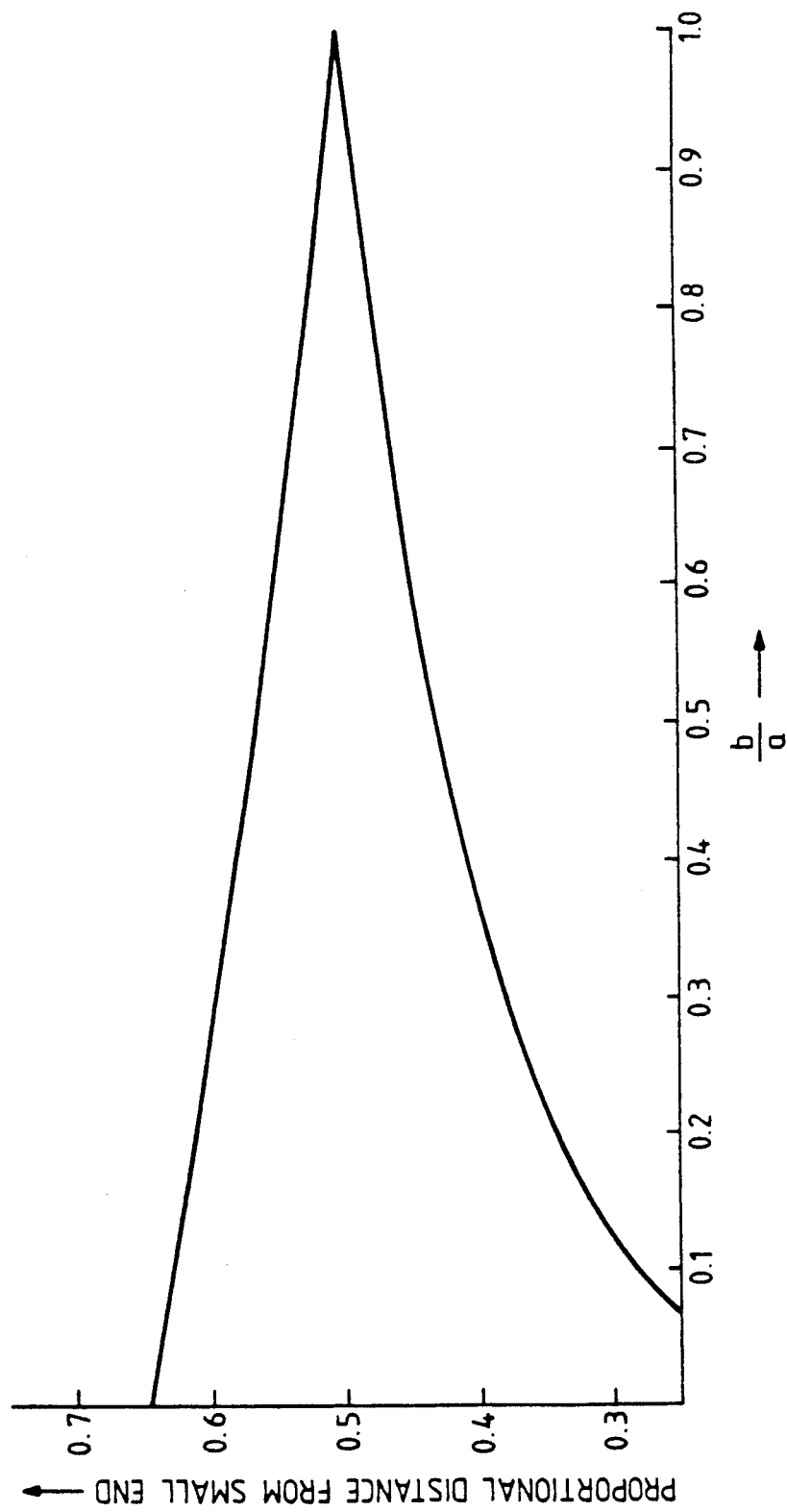

GAS RESONANCE DEVICE

This is a continuation of application Ser. No. 07/398,306 filed Aug. 25, 1989, now U.S. Pat. No. 4,948,360 which is a continuation of application Ser. No. 07/117,783, filed Nov. 6, 1987, abandoned.

In an oscillating column of gas a small region of the gas is initially displaced in one direction, is compressed, moves back in the opposite direction, and expands. During compression the gas is heated and, during expansion, is cooled. When such an oscillating column of gas is brought into contact with a stationary solid medium, heat transfer takes place between the gas and the medium. When the medium has a high effective heat capacity compared with that of the gas and a low thermal conductivity in the direction of advancement of oscillations of the gas, it stores heat acquired as a result of the adiabatic compression of the gas and then, returns this stored heat to the gas after its expansion. Whilst this is true for regions of gas which are always located adjacent the medium a different situation exists at the ends of the medium. At the downstream end of the medium, when considered in the direction of advancement of the oscillation, a region of gas which is in thermal contact with the ends of the medium is moved in the one direction away from the medium and compressed during oscillation. The gas is heated upon compression. Upon subsequently moving in the other direction and expanding it returns to its position adjacent the end of the medium. Here, since it cools during expansion, it once again accepts heat from the medium. This gives rise to a region of heated gas downstream from the downstream end of the medium. Conversely, at the upstream end of the medium particles of gas which are not normally in contact with the medium move forward in the one direction during the oscillation are compressed and heated and then in their forwards position are in thermal contact with the medium so giving heat to the medium. As this region of gas moves backwards in the opposite direction to return to its initial position, it expands and cools. Since in their initial position the particles of gas are out of thermal contact with the medium this gives rise to a cold region upstream from the upstream end of the medium.

Such a medium located in an oscillating gas column is usually referred to as a regenerator and is often used with Stirling cycle engines. Typically such a regenerator must have as large a surface area as possible, a high effective heat capacity compared with that of the gas and a low thermal conductivity along the direction of gas motion. Conventionally pads of randomly close-packed metallic wire have been used as a regenerator but it is also possible to use closely packed stacks of non-metallic plates and these are more efficient with regard to gas friction losses and heat transfer. Thus, the use of a regenerator enables a temperature difference to be established from an oscillating gas flow. Conversely, it is also known that if a temperature difference of sufficient magnitude is applied across such a regenerator oscillations are spontaneously induced in gas surrounding such a regenerator.

It is also known that oscillations can be established in a column of gas located in a resonance chamber by simply applying heat to one end of the chamber if a sufficiently high temperature differential is established. As examples of this gas in an organ pipe can be made to resonate by a hydrogen flame in the base of the pipe as described by Higgins as long ago as 1777, and the Taconis oscillations reported in 1949 experienced when placing a tube at room temperature into a cryogenic storage vessel.

A reasoned discussion of these effects is given in an article by Wheatley, Hofler, Swift and Migliori entitled "An intrinsically irreversible thermoacoustic engine" published in the American Journal of Physics Volume 53 (2) February 1985, at page 147.

According to this invention a thermally driven gas resonance device comprises a resonance tube which expands in cross-section along its length from one end to the other, a heat source located at the one end of the resonance tube, and means to trigger oscillations in a gas in the resonance tube.

The heat source may be formed by a simple, indirect heater in which the source of the heat such as an electrical heating element or a gas or oil burner assembly is used to heat a plate forming or located in the one end of the gas resonance tube. Preferably the heated plate is finned to improve the heat transfer from it to the gas at the one end of the resonance tube. A regenerator may be located in the resonance tube close to but out of contact with the heated plate and from the means to trigger the oscillations. The regenerator consists of a material having a large surface area, a high effective heat capacity compared with that of the gas in the resonance tube and a low thermal conductivity along the length of the resonance tube, the arrangement being such that, in use, the heat source sets up a temperature gradient along the regenerator which triggers the oscillations of the gas in the resonance tube.

However, it is very much preferred that the heat source and the means to trigger the oscillations in the gas in the resonance tube are both formed by a pulsed heat source having a pulse repetition frequency corresponding to a resonant frequency of the gas resonance tube. Such a pulsed heat source may comprise a pulsed combustor or a resonant flame fed with a premixed supply of inflammable gas or vapour and air through a valve, followed by a flame trap, and an ignitor intially to ignite the mixture in the one end of the resonance tube or in a combustion chamber leading into the resonance tube. Preferably the valve to admit the mixture is formed by a tuned non-return valve which, in response to the pulsed combustion, oscillates between its open and closed states to admit bursts of mixture into the one end of the resonance tube or combustion chamber for subsequent ignition. The use of the pulsed heat source to trigger the oscillations in the gas in the resonance tube provides easy starting under wide range of conditions, followed by stable resonant operation. The ignitor may be formed by a sparking plug to cause initial ignition of the pulsed heat source but, once ignited the pulsed heat source is preferably self-sustaining. This may be as a result of subsequent bursts of mixture being ignited by the fading flame from a preceding combustion pulse, by spontaneous ignition as a result of a compression wave or by the ignitor having the form of a glow plug which provides a local hot spot to cause ignition.

The pulsed heat source may also include an indirect heater located at the one end of the resonance tube. The indirect heater may be formed by a heat exchange surface heated by the pulsed heat source to spread the heat of combusion substantially uniformly over the cross-sectional area of the one end of the resonance tube. Preferably when the gas resonance device includes a pulsed combustor the one end of the resonance tube is formed as a parabolic reflector which spreads the effect of the pulsed combustion more uniformly over the one end of the resonance tube. In this case the pulsed combustion is arranged to take place substantially at the focus of the parabolic reflector. When the gas resonance device includes a pulsed heat source it may also include a regenerator which co-operates with a temperature gradient subsisting across it to amplify the oscillations induced by the pulsed heat source.

With all of these arrangements to generate oscillations in the gas it is necessary to arrange the shape of the resonance tube both to provide the required relative pressure and adiabatic temperature amplitudes of the two ends of the tube and to minimise gas wall friction losses which tend to inhibit the resonant oscillations of the gas. By having the resonance tube expanding in cross-section from its one end to its other larger pressure and adiabatic amplitudes are developed at the small relative to large end and this is discussed in detail dynamically subsequently. Preferably the resonance tube is generally frustoconical in shape with the ratio of base diameter to height approximately equal to 3:1. Firstly this provides a diameter to length ratio for the longitudinal oscillation which can be thought of as a gas piston to be as large as practical thereby minimising wall friction losses. The resonant frequency of the resonance tube depends mainly upon its length and is independent of its shape. By making the resonance tube increase in cross-sectional area from its one end to its other end it is possible to increase the mass of gas which oscillates and thereby decrease its velocity for a given volume compression ratio. Friction losses are proportional to the cube of the gas velocity and consequently this reduces the friction losses considerably to enhance the performance of the resonance device. Preferably the resonance tube has a frusto-ogival shape in longitudinal-section so that, when seen in cross-section, its side walls are curved. This provides a further increase in the mass of oscillating gas closer to the one end and so enhances the reduction in friction losses still further.

The mechanical energy produced in the oscillating gas in the gas resonance device may be used to operate a pressure swing gas separator with a molecular sieve material. One of the most straightforward arrangements is to use the gas resonance device in an apparatus for the pressure swing separation of oxygen from air. In this case the other end of the resonance tube contains a molecular sieve material, a gas exchange port is provided on the side of the molecular sieve material towards the heat source, and a gas outlet is provided upon the side of the molecular sieve material remote from the heat source. During oscillation as air moves forwards through the bed of molecular sieve material nitrogen is preferentially adsorbed by the molecular sieve material. As the air moves backwards a reduced pressure is created and gases adsorbed onto the surface of the molecular sieve material are desorbed. Thus, when the molecular sieve material is subjected to the oscillations generated in the resonance tube nitrogen, which is preferentially adsorbed by the molecular sieve material tends to return to the inside of the resonance tube and hence out of the gas exchange port, whereas oxygen, which is less adsorbed by the molecular sieve material, tends to be driven through the bed of the molecular sieve material and out of the gas outlet at the downstream side of the molecular sieve material. The finite displacements of the gas that occur during oscillation create a mean pressure slightly above ambient in the resonance tube so that a continuous flow of separated oxygen emerges below the bed of molecular sieve material.

Typically the molecular sieve material is an expanded zeolite but active carbon may also be used. The molecular sieve material preferably has sufficient surface area to permit a high nitrogen adsorbtion rate and it has been found that the cumulative rate of adsorbtion and desorbtion is proportional to pressure swing and nearly independent of cycle rate.

In an alternative configuration the mechanical energy produced in the oscillating gas in the resonance tube is used to drive a heat pump. In this case the gas resonance device includes a heat sink located at its other end, a regenerator located adjacent the other end, and means on the side of the regenerator towards the heat source to effect heat exchange between the gas in the resonance tube and a source of low grade heat.

With this arrangement the effects discussed earlier are used to provide a heat engine driven heat pump. Thus the oscillations in the gas in the resonance tube are applied to the regenerator to produce a temperature differential across it with the gas downstream of the regenerator at the other end of the resonance tube being heated and with the gas upstream from the regenerator being cooled. The heat exchange that takes place upstream of the regenerator provides the heat for the expansion of the gas upstream from the regenerator and provides the source of the heat which is pumped to provide part of the heat removed by the heat sink at the other end of the resonance tube. In addition to this the heat sink at the other end of the resonance tube also receives heat provided by the heat source. The applicant has coined the acronym HASER to describe this type of heat engine driven heat pump with the acronym standing for "Heat Amplification by Stimulated Emission of Radiation" by analogy with the acronyms laser and maser.

When the source of low grade heat is the atmosphere, it is preferred that a direct heat exchange takes place between the atmosphere and gas in a region upstream of the regenerator. To provide this gas exchange ports are provided in the wall of the resonance tube at the position of a pressure null point. As the longitudinal vibrations pass down the resonance tube the atmosphere tends to be drawn into the resonance tube through the ports after the compression oscillation has passed the ports. The gas that is drawn into the resonance tube from the atmosphere then mixes with the gas in the resonance tube with a resulting heat exchange taking place between the gas from the atmosphere and the gas already in the resonance tube. The next oscillation then tends to drive the now cooled atmospheric air out of the ports.

Preferably however the haser also includes a fan to drive air from the atmosphere through the gas exchange ports into the resonance tube. Preferably an outer chamber surrounds the resonance tube with the fan located at the top, that is the end of the resonance tube with the heat source, and a corrugated annular baffle adjacent the gas exchange ports to direct air blown by the fan through half of the ports and allow cooled air to leave from the other half of the ports and flow through the lower portion of the outer chamber. The air flowing through the outer chamber absorbs heat given off from the heat source and upper part of the gas resonance tube and this heat is re-introduced into the system as part of the low grade heat so further improving the heat output of the haser.

The expansion of the cross-section of the resonance tube from the one end of the other has further advantages in a haser. The relative cross-sectional areas of the two ends determine the compression ratio developed at them. A small cross-section leads to a high compression ratio and vice versa. The effect of this can be derived from acoustic theory of small displacements and is developed for the particular example subsequently. The expanding cross-section of the resonance tube from the one end to the other leads to a high compression ratio for the driving end and a low compression ratio at the pump end and this provides the optimum thermal efficiency.

The heat sink at the other end of the resonance tube may comprise a shallow pool of water and, in this case, it is preferred that fins of a good thermal conductor such as metal are in thermal contact with the pool of water and extend in the space between the pool of water and the downstream side of the regenerator. Such a heat sink has a good thermal contact with the hot gas downstream of the regenerator. The water in the pool is circulated around a system to carry the heat away from the other end of the resonance tube and this circulation system may include non-return valves on both sides of the pool so that the water is driven around the system by the pressure fluctuations inside the resonance tube acting on the surface of the water in the pool.

Such a haser has particular application as a hot water generator for use in heating and cooling a residential building. The haser is typically located in the roof space of a building and, in winter, the roof space is ventilated or air from outside ducted to it so that air provides the source of low grade heat. The heat sink at the other end of the resonance tube is used to heat water to a temperature of say 40° C. and this water is used for domestic hot water requirements and is circulated around a central heating system of the building. During summer the haser is used to provide cooling for the building by closing the ventilation of the roof space and opening cooling vents in ceilings of the rooms below the roof space or ducting the air leaving the haser to the rooms. Water from the heat sink at the other end of the resonance chamber is used for domestic hot water requirements and also is led away to a heat exchanger outside the building where it is cooled. The resulting cool air discharged from the resonance tube cools the roof space and, in turn, through the cooling vents in the ceilings, or via the ducting cools the building.

A pressure swing gas separator may be combined with a haser by placing molecular sieve material in the resonance cavity above the regenerator. With this combination the output from the outlet ports is cool and rich in nitrogen. Such an output is good for preserving perishables and such a combined device provides a readily portable, self-contained source of nitrogen enriched cold air.

A particular example of a haser in accordance with this invention will now be described with reference to the accompanying drawings, in which:

FIG. 5 is a graph showing the characteristics of the resonance tube;

Figure 1:
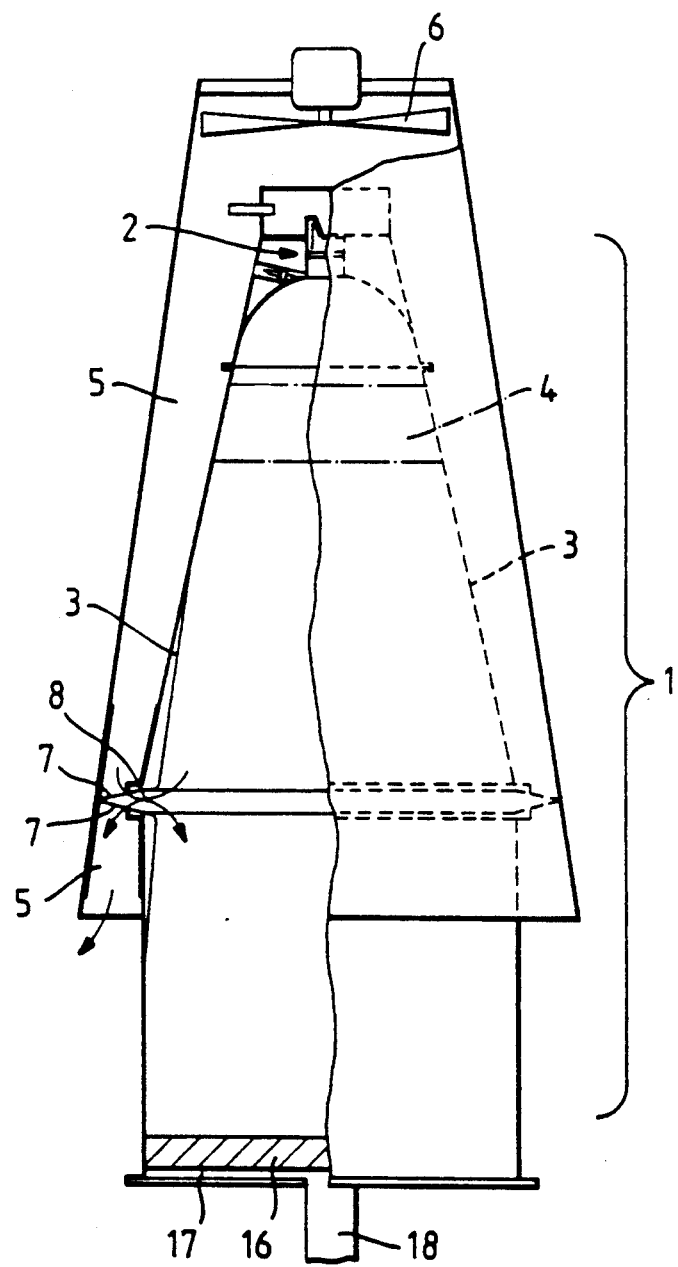
FIG. 1 is a partly sectioned side elevation of a pressure swing gas separator.
Figure 2:
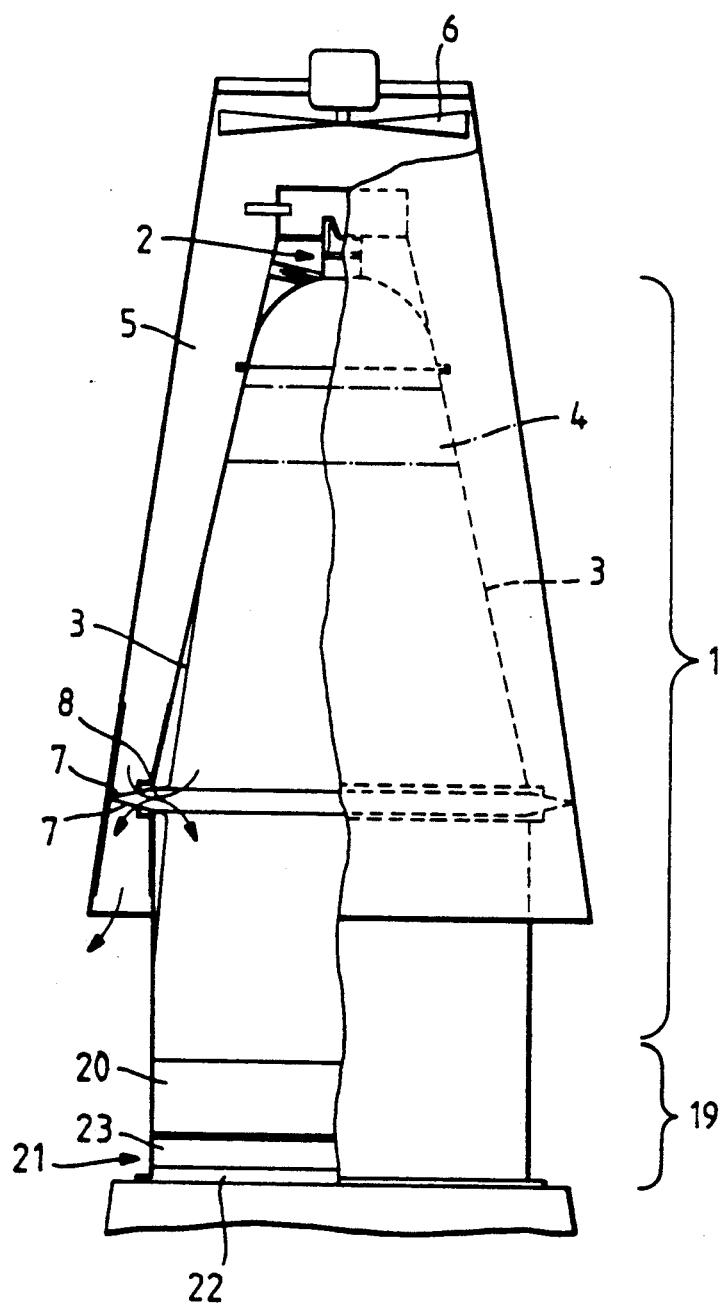
FIG. 2 is a partly sectioned side elevation of a haser.

Both the pressure swing gas separator shown in FIG. 1 and the haser shown in FIG. 2 include a heat engine 1 formed by a pulsed heat source 2 mounted at one end of a resonance tube 3 which is ogival in longitudinal section. The overall dimensions of the resonance tube 3 are such that its height is about three times its base diameter. A regenerator 4 may be included towards the top of the resonance tube and this is made from a non-metallic honeycomb which is typically made from glass or a glass-like material. An outer concentric annular chamber 5 surrounds the resonance tube 3 and an electrically driven fan 6 is mounted at the top to blow air downwards through the chamber 5. A corrugated annular baffle 7 directs the flow of air through alternate open ports 8 provided in the side wall of the resonance tube 3 at a pressure null point. Air is discharged through the other ports 8 and a lower portion of the outer chamber 5 The open ports 8 produce orifice flow and therefore inwards air flow through alternate ports 8 is strongly converging which ensures that charge and discharge through the ports 8 is not unduly mixed.

Figure 3:
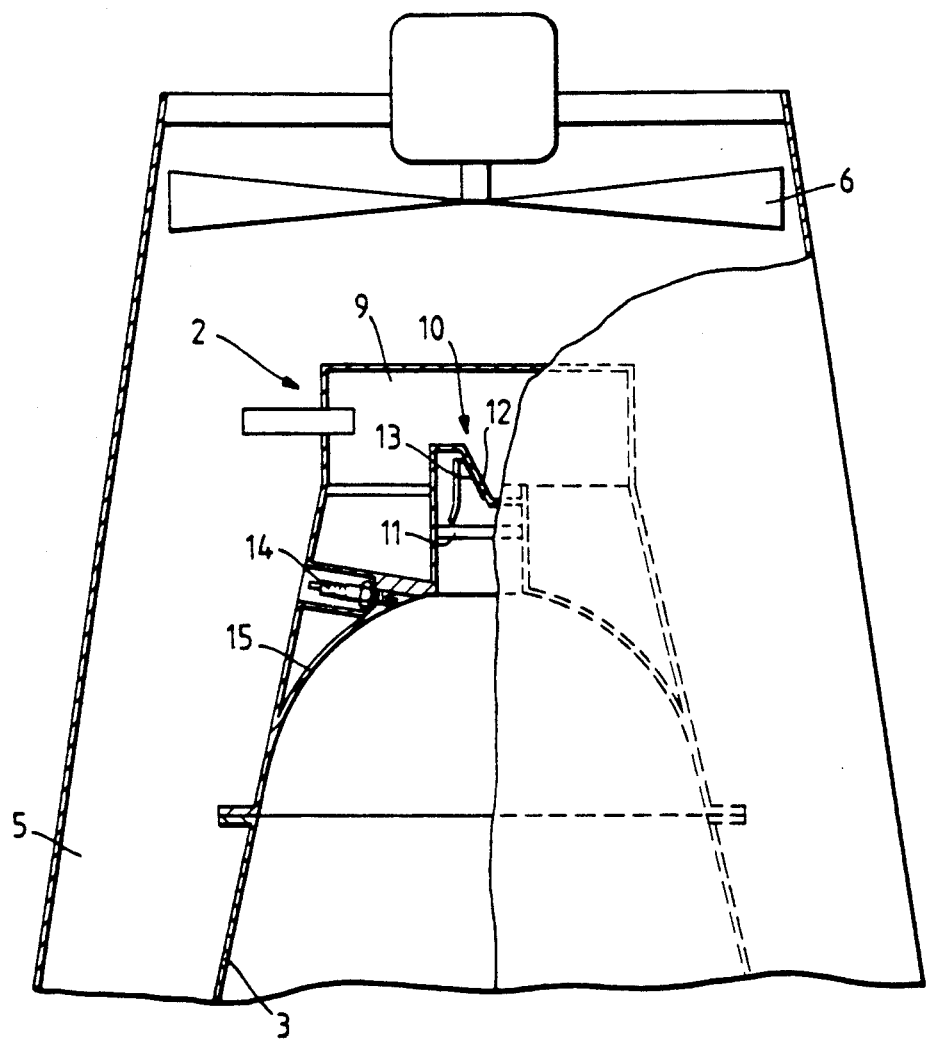
FIG. 3 is a cross-section through a heat source.

The pulsed heat source 2 is shown in more detail in FIG. 3 and comprises a gas mixing space 9 to which gas and air are supplied and in which they are mixed, a resonant non-return valve 10 of similar resonant frequency to that of the resonance tube 3, and a flame trap 11. The resonance non-return valve 10 may be similar to those fitted to two-stroke engines and comprise an open port 12 covered by a springy plate 13 which is fixed along one edge to the port 12. In response to the instantaneous pressure in the resonance tube 3 being greater than that in the gas mixing space 9 the valve is held closed with the springy plate 13 forming a seal against the edges of the port 12, and in response to an instantaneous reduction in pressure in the resonance tube 3 with respect to that in the gas mixing space 9, the springy plate 13 bends to allow the gas and air mixture to pass through the port 12 and into the resonance tube 3.

In a preferred configuration which leads to gas mixture delivery more closely in phase with the resonance chamber compression pulse, and thus to concomitant improvement in pulsed combustion, the resonance non-return valve consists of a metal disc of relatively large diameter, placed co-axially with the combustion chamber, clamped at its edges to a slightly concave bedplate in which the flame trap is centrally located. Gas mixture is introduced at low pressure to an internal annulus close to the clamped edges, and is thereby fed radially inwards in pulses towards the flame trap. The disc is of such thickness that its natural frequency of axial oscillation is lower than that of the resonance cavity so that the combined effect of the gas damping and the cavity pressure pulses is to produce substantially antiphase oscillations of the disc at the resonant frequency of the cavity. These oscillations introduce gas mixture through the flame trap to the combustion chamber at the time of pressure rise instead of the time of maximum suction, and the former diminishes the extent of premature combustion, which is inefficient with regard to heat engine operation.

The pulsed heat source 2 also includes a sparking plug 14 and the top of the resonance tube 3 is formed as a parabolic reflector 15 which spreads the effect of the pulsed heat source substantially uniformly over the end of the resonance tube 3.

The heat engine 1 drives a gas oscillation down the resonance tube 3 and the vertically oscillating mass of gas functions as a piston producing pressure and adiabatic temperature fluctuations at top and bottom of the tube 3. The oscillations are triggered by the sparking plug 14 initially igniting the gas and air mixture introduced into the top of the resonance tube 3 and then, as the gas in the tube 3 begins to resonate and the valve 10 introduces successive bursts of mixture these are ignited by the fading flame from the previous ignition. This produces a pulsed combustion which, in a device having a resonance tube of length about 1 m has a repetition frequency of around 200 Hz. The regenerator 4 increases the efficiency of the heat engine 1 by increasing the temperature of the top end of the resonance tube 3 and increasing the amplitude of the ocillations produced.

The heat engine 1 just described may be used to provide the mechanical energy input for a pressure swing gas separator and, in this case, as shown in FIG. 1 a shallow bed 16 of a zeolite which preferentially adsorbs nitrogen is placed towards the lower end of the resonance tube 3 and the base of the resonance tube is closed by a plate 17 including a gas outlet 18. During resonant oscillation in the resonance tube 3 as the air moves forwards into the zeolite bed 16 nitrogen is preferentially adsorbed by the zeolite. As the air moves backwards a reduced pressure is created and the gases adsorbed onto the surface of the zeolite are desorbed so that air rich in nitrogen is desorbed. As a result of the finite displacements of gas that occur during oscillation the average pressure inside the resonance tube 3 is greater than atmospheric so that a flow of gas passes through the zeolite bed 16 resulting in a flow of gas out of the output 18 which is rich in oxygen whilst the flow of gas out of the ports 8 and through the lower part of the chamber 5 is rich in nitrogen.

The heat engine 1 may alternatively be used to provide the mechanical energy to drive a heat pump 19. A heat engine driven heat pump has an overall coefficient of performance (COP) where $$COP = \frac{\text{low grade heat out}}{\text{high grade heat in}}$$

in excess of unity, provided that the adiabatic temperature ratio of the former significantly exceeds that of the latter. The heat output may also be directly supplemented by heat rejected from the heat engine 1. The heat pump part 19 of the apparatus comprises a regenerator 20 which is made from a non-metallic honeycomb which is typically made of glass or glass-like material and a heat sink 21. The heat sink 21 is formed by a shallow pool of water 22 in the large diameter end of the resonance tube 3 and metallic fins 23 in thermal contact with the shallow pool of water 22 extend into the resonance tube 3 towards the regenerator 20. Air, which in this case provides the low grade source of heat enters and leaves through the ports 8 and heat is extracted from this air by the heat pump 19 and transferred to the water 22 in the heat sink 21.

Thus, in operation, gas oscillations are induced by the heat engine 1 inside the resonance tube 3. These oscillations provide the driving power for the heat pump 19 including the regenerator 20. As the gas oscillates around the regenerator 20 the space beneath the regenerator 20 is heated and the space above the regenerator 20 cooled. Air flow through the ports 8 mixes with the gas in the resonance tube 3 and gives heat to the gas in the resonance tube 3 above the regenerator 20. The heat sink 21 removes the build up of heat beneath the regenerator 20.

Typically the level of the shallow pool 22 of circulating water in the heat-sink 21 is controlled by a float valve (not shown). A water inlet and outlet for the pool 22 includes non-return valves (not shown) and the gas oscillations set up in the resonance tube 3 act on the surface of the water in the pool 22 and cause circulation of the water through the inlet and outlet non-return valves. Typically the water outlet temperature is about 40° C. and this can be used as a source of domestic hot water or a source of hot water for driving a central heating system. Typically a haser as shown in this example is mounted in the roof space of a house which is ventilated in the winter to allow air from the atmosphere to provide the source of low grade heat entering and leaving the ports 8. If desired to cool the building during the summer months, ventilators for the roof space would be closed and ceiling louvres opened to allow the cold air generated by the haser to gravitate into the house. In this case the hot water discharged from the heat sink 21 is, after the needs for domestic hot water have been supplied, passed to an atmospheric heat exchanger out of doors to dissipate the heat generated in the haser before being recirculated. The target value of the COP for such a haser would be 2 in the heating mode.

The details of the gas resonance dynamics, the desirability of the ogival shape of the resonance chamber, a discussion on the wall friction losses, and a discussion on the characteristics of the regenerator 20 will now be provided.

The Dynamics of Gas Resonance

Figure 4A:
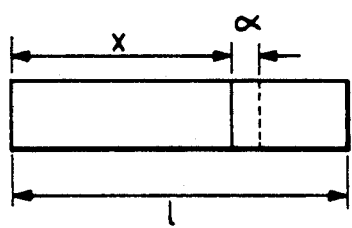
FIGS. 4a and 4b are diagrams illustrating the dimensions of the resonance tube and the gas displacements for parallel and conical tubes, respectively.

It is necessary to develop a quantitative treatment of gas motions in order to design a haser. Linear elastic displacements of a uniform solid or fluid in a parallel configuration (FIG. 4a) are governed by the well-known equation:

$$\frac{\partial^2 \alpha}{\partial t^2} = c^2 \frac{\partial^2 \alpha}{\partial x^2} \quad (1)$$

where $\alpha$ is displacement at reference distance x, t is time lapse and c is velocity of sound. For a standing wave in a tube with closed ends where cross-section is also uniform, $\alpha$ is proportional to:

$$\sin \frac{\pi x}{l} \sin \frac{\pi c t}{l}$$

Figure 4B:
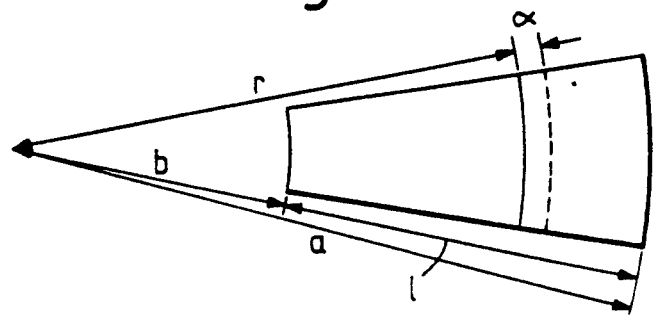

The corresponding governing equation for spherical symmetry, applicable to oscillatory flow in a truncated cone, has been known since the times of Cauchy and Poisson, and is:

$$\frac{\partial^2 (r\alpha)}{\partial t^2} = c^2 \frac{\partial^2 (r\alpha)}{\partial r^2} \qquad (2)$$

where r is defined as in FIG. 4b. In both cases $$c = \sqrt{\frac{\gamma p_o}{\rho_o}},$$

where $\gamma$ is the ratio of specific heat and $p_o$ is the mean pressure at which density is $\rho_o$. When the cone is truncated at the radii b and a it may readily be verified that a standing wave solution with arbitrary constant A is:

$$r\alpha = \frac{A1}{\pi} \sin \frac{\pi}{1} (r - b) \sin \frac{\pi c t}{1}$$

so that:

$$\alpha = A \frac{\sin \frac{\pi}{1} (r - b)}{\frac{\pi r}{1}} \sin \frac{\pi c t}{1} \qquad (3)$$

which becomes zero both at r=b, and r=a since a+b=1. It is convenient in the following to put:

$$\frac{\pi r}{1} = \theta, \frac{\pi b}{1} = \theta_o, \frac{\pi a}{1} = \theta', \frac{\pi A}{1} = \mu, \qquad (4)$$

and $\frac{\pi c}{1} = \omega$, so that: $\theta' = \mu \frac{\sin (\theta - \theta_o) \sin \omega t}{\theta}$ $\theta'$ is a maximum when $$\frac{\partial \theta'}{\partial \theta} = 0,$$

hence when $\theta = \tan (\theta - \theta_o)$, which can be solved in terms of $\theta_o$ for particular values of $\theta$, as in FIG. 5, noting that $$\frac{b}{a} = \frac{\theta_o}{\pi + \theta_o} \text{ and } \frac{d}{1} = \frac{\theta - \theta_o}{\pi},$$

where d is the distance of the maximum position from the small end.

Neglecting second order small quantities it may be shown that the instantaneous density ratio is:

$$\frac{\rho}{\rho_o} = \left[ 1 + \frac{2\alpha}{r} + \frac{\partial \alpha}{\partial r} \right]^{-1} \qquad (5)$$

$$= \left[ 1 + \frac{A}{r} \cos \omega t \left( \cos (\theta - \theta_o) + \frac{\sin (\theta - \theta_o)}{\theta} \right) \right]^{-1}$$

which is unity when $\theta = -\tan (\theta - \theta_o)$, and is solved in the same way to calculate $$\frac{d'}{1}$$

with results plotted in FIG. 5. It is seen that maximum displacement and velocity occur at a position displaced from the midpoint towards the small end of the cone, and the density and pressure null point is displaced by a corresponding distance towards the large end.

The extreme values of $\rho_o$ from equation 5 are obtained when cos $\omega t$ and cos $(\theta - \theta_o)$ are both $\pm 1$, so that volume compression ratios $m_o$ and $m_1$ may be defined, relating to the small and large ends respectively. Then:

$$m_o = \frac{1 + \frac{A}{b}}{1 - \frac{A}{b}}, \quad m_1 = \frac{1 + \frac{A}{a}}{1 - \frac{A}{a}} \qquad (6)$$

If $m_o$ and $$\frac{A}{b} = \frac{m_o - 1}{m_o + 1}.$$

Then;

$$m_1 = \frac{1 + \frac{b}{a} \cdot \frac{m_o - 1}{m_o + 1}}{1 - \frac{b}{a} \cdot \frac{m_o - 1}{m_o + 1}} \qquad (7)$$

are specified, A may be eliminated by the deduction from equation 6 that:

$$\frac{A}{b} = \frac{m_o - 1}{m_o + 1}.$$

Then;

$$m_1 = \frac{1 + \frac{b}{a} \cdot \frac{m_o - 1}{m_o + 1}}{1 - \frac{b}{a} \cdot \frac{m_o - 1}{m_o + 1}} \qquad (7)$$

Furthermore, it may be deduced from equations 3 or 4, in combination with FIG. 5, for any point distance x from the small end that:

$$\theta' = \frac{\pi a}{1} = \frac{m_o - 1}{m_o + 1} \cdot \frac{\sin \frac{\pi x}{1}}{1 + \frac{x}{1} \left( \frac{a}{b} - 1 \right)} \qquad (8)$$

Figure 6:
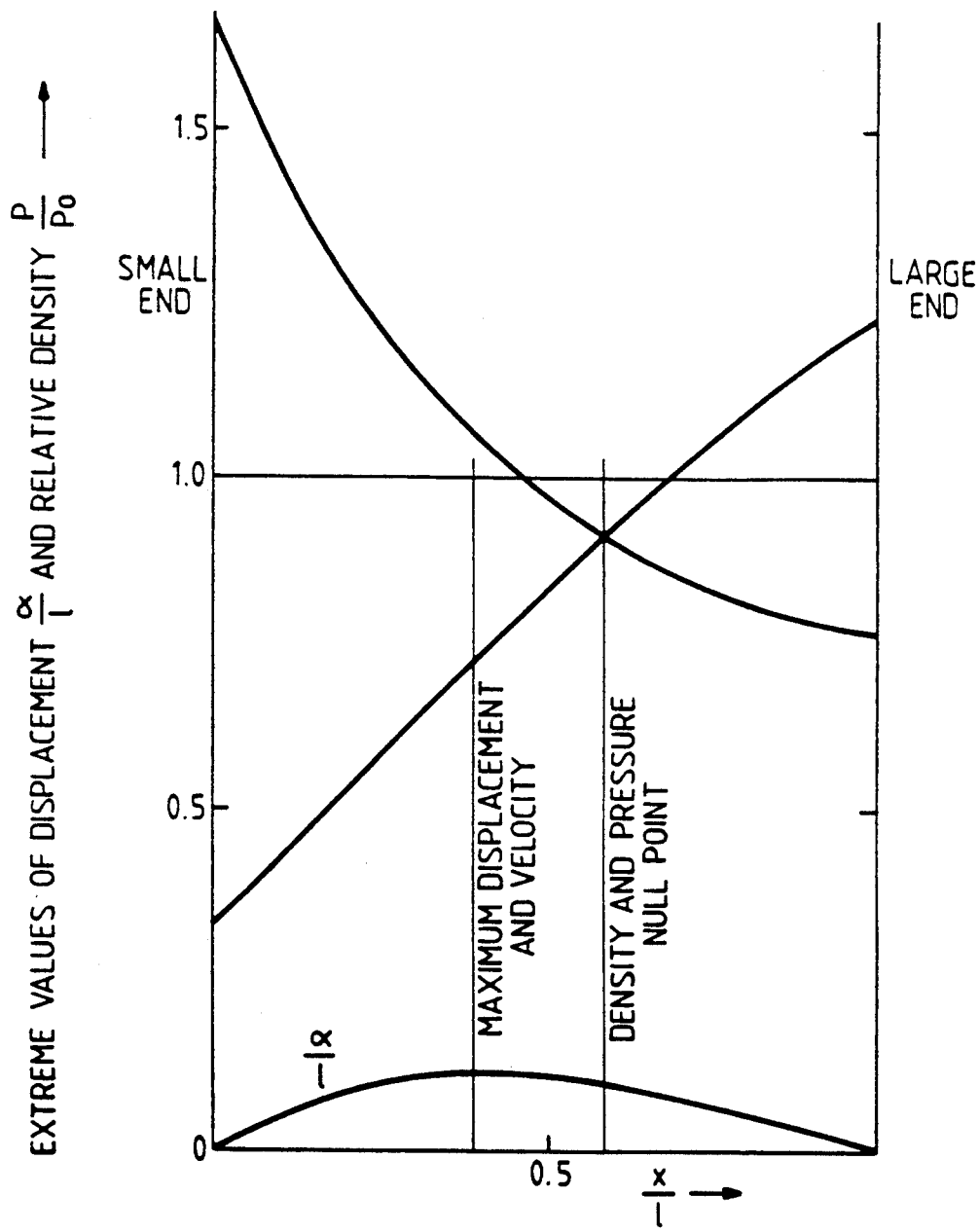
FIG. 6 is another graph illustrating how displacement and density amplitudes vary with respect to time over the length of the resonance tube.

In particular, x=d for maximum displacement or velocity, and x=d' for the corresponding displacement or velocity at the null point of density or pressure change. However, when taking into account the finite displacements as in the plot of extreme values of $$\frac{\rho}{\rho o}$$

against $$\frac{x}{1}$$

shown in FIG. 6, it is seen that the actual value of $$\frac{\rho}{\rho o}$$

at the null point is proportionally reduced relative to the unit reference value. The value of this proportional reduction $$\Delta \frac{p}{p_o}$$

may be calculated from the slope of the curves derived from equation 5, referred to the null point and multiplied by the relevant displacement. Thus:

$$\Delta \frac{p}{p_o} = \left(\frac{\pi a}{l}\right)^2 \qquad (9)$$

obtained from equation 8 with $x = d'$. It may be noted from this that there is an equivalent excess mean density and pressure for open cycle applications, since inflow and outflow must be balanced.

The preceding analysis is based as stated upon linear-elastic relationships, which are realised with gases only for small displacements. Adiabatic behaviour is non-linear, but the effects of the non-linearity have been extensively studied for free piston applications, and found to be significant only for high compression ratios, which are themselves marginally increased from values calculated by linear elastic methods, and time rates of change are momentarily increased, so that frequencies are somewhat higher than calculated. The linear theory successfully predicts the location of the pressure null point in experiments with the oscillating haser, but observed resonant frequencies are higher than predicted values, consistent both with the aforementioned non-linearity of adiabatic gas compression, and the increase of sonic velocity with temperature in the upper part of the resonance tube. It may therefore be claimed that the theory as presented is sufficiently accurate to be used with confidence, and that corresponding proportional adiabatic excursions of pressure and absolute temperature may be obtained from the proportional density excursions by raising the latter to the powers $\gamma$ and $\gamma - 1$, respectively.

Coefficient of Performance

Since the Carnot thermal efficiency at the heated end, determined from the ratio of absolute temperatures in the cycle, is:

$$\frac{m_o^{\gamma-1} - 1}{m_o^{\gamma-1}},$$

and the corresponding heat pump gain, determined from the ratio of absolute temperatures in the cycle at the absorber end, is:

$$\frac{m_1^{\gamma-1}}{m_1^{\gamma-1} - 1},$$

it follows that the idealised coefficient of performance is:

$$COP = \frac{m_o^{\gamma-1} - 1}{m_o^{\gamma-1}} \cdot \frac{m_1^{\gamma-1}}{m_1^{\gamma-1} - 1} \qquad (10)$$

With $\gamma = 1.4$ for air, this value for the example of FIG. 6 is 2.77, but it will be modified by several factors.

Firstly, it can be argued that heat is not rejected at the low temperature corresponding with expansion at the heated end, nor is it absorbed at a temperature corresponding with full compression at the absorber end, This is considered later with reference to the regenerators where it is demonstrated that the function of the regenerators is to lift the average temperatures at both ends, so that the ideal is more closely approached.

Secondly, although a proportion of the wall friction heat could be recovered with a water jacket, as in the case with heat rejected at the heat engine end, the former has to be provided as mechanical power subject to the limited thermal efficiency of the heat engine function, and is subject thereby to substantial leverage. Mechanical power is also dissipated in the air entry and discharge through the ports 7 and 8 but a proportion of this is common to wall friction loss, since both are concerned with the boundary layer.

The Ogival Shape Modification

The purpose of this for given end diameters is to increase the mass of oscillating gas, thereby to decrease its velocity for given volume compression ratios. The effect is worth incorporation since friction loss is proportional to the cube of velocity. A full numerical analysis would be feasible, but the effect is likely to be contained adequately within a correction.

The key to the correction procedure is found in the first order dependence of natural frequency f on length l, irrespective of shape, whether parallel, conical or ogival, such that:

$$f = \frac{c}{2l}$$

Figure 7:
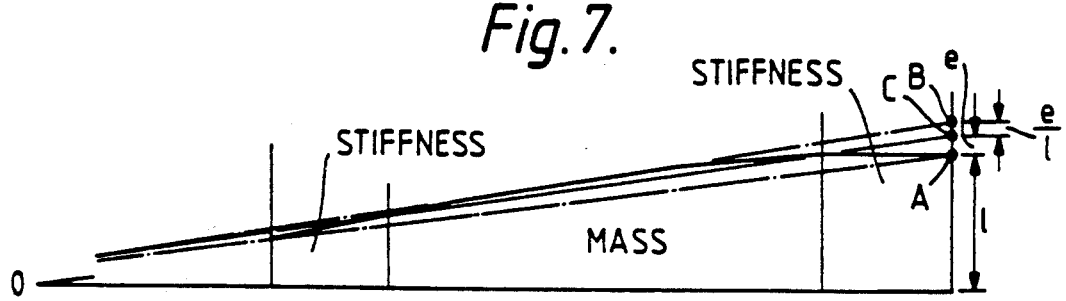
FIG. 7 is a further graph illustrating the effect of ogival correction.
Figure 8:
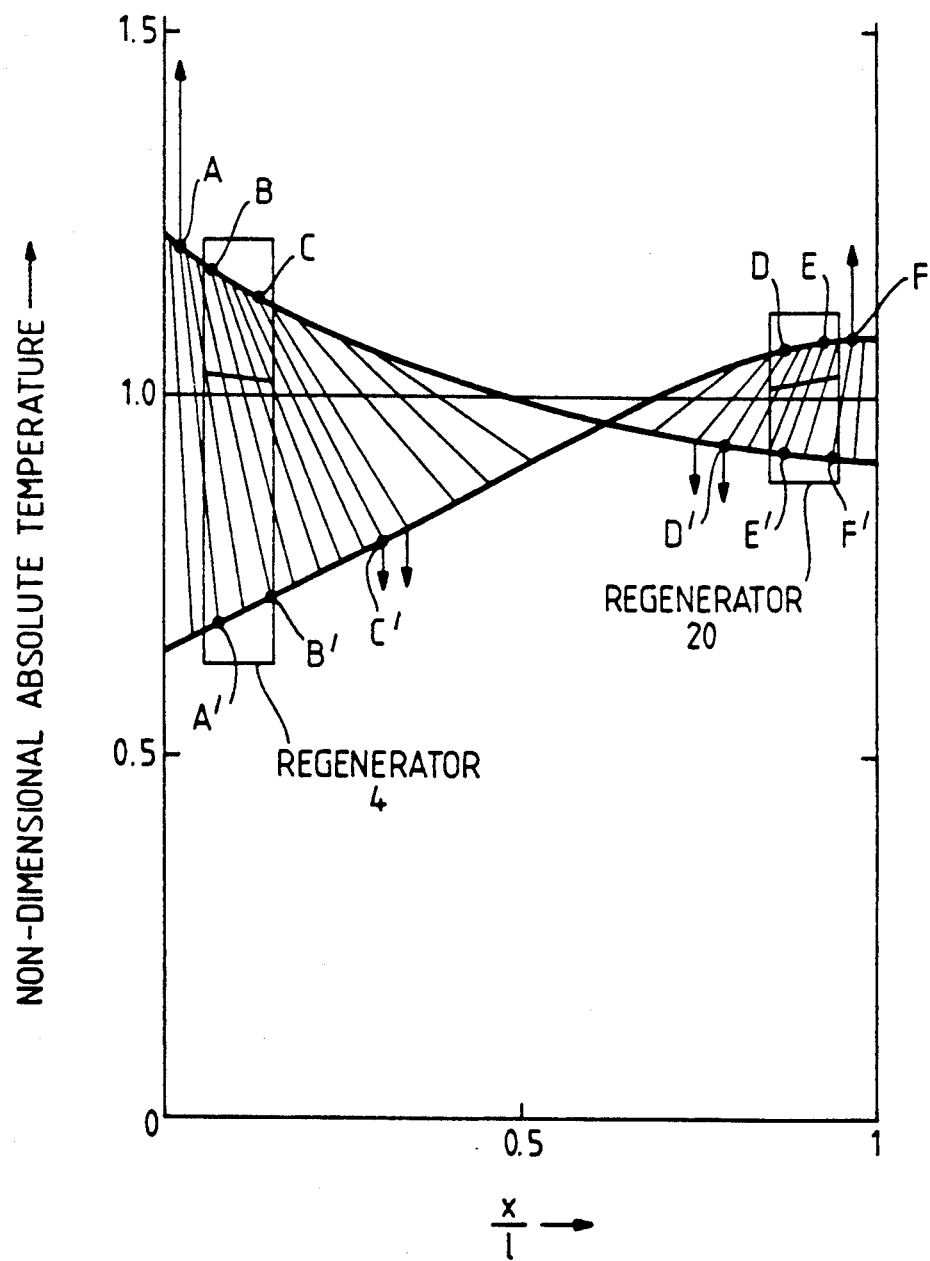
FIG. 8 is a temperature against position diagram to illustrate the operation of the regenerator.

Angular frequency $\omega$ for an oscillating system is also dependent upon:

$$\omega = \sqrt{\frac{k}{m}}$$

where k is stiffness and m is mass so that, in the ogival case, stiffness must be considered to be increased by the same proportion as mass. The consequence of this is seen in FIG. 7, where there are three notional concentric cones OA, OB and OC. OA is that which contains the diameters of the two ends, and OB circumscribes the ogival curve. OC is an interpolation. It will be recognised that the preceding theory is unchanged in relation to the three cones, since all have the same ratio $$\frac{b}{a}.$$

Cone OC intercepts the ogival curve to define a mass zone and two stiffness zones. If the diameter ratio between OA and OC is $1 + e$, it follows from considerations of volume and cross-section area that the stiffnesses are also increased by the ratio $1 + e$. However, irrespective of the definition of e the enclosed volume designated as mass is increased by a ratio in excess of $1 + 2e$, and this anomaly can be explained in terms of the hydrodynamic concept of virtual mass, which in this case is negative because of velocities which are lower within the enlarged cross-section. Since stiffness can be calculated without ambiguity it is appropriate to consider that both stiffness and apparent mass are increased by $1+e$, and that OC is defined as the neutral axis of the ogival curve between the two ends (equal surface area), such that $$BC = \frac{e}{2}.$$

Then the ogival shape behaves in relation to friction loss but not to compression ratio or output as though it is a cone with diameters increased in the ratio $1+e$, but with peak velocities decreased in the ratio $$\frac{1}{1+2e}.$$

The effect of the ogival shape shown in FIGS. 1 and 2 is to reduce friction loss by 50% for circumstances which are otherwise equivalent.

Wall Friction Losses

In the absence of specific data for oscillatory flow in cones, it is appropriate to consider steady state boundary layer friction in a parallel pipe of equivalent length and diameter. The friction coefficient $c_f$ depends upon Reynold's number and proportional surface roughness, and is given by the standard data of Nikuradse. For the Reynold's numbers $>10^6$ and surface roughness $<50$ micron, a suitable value for $c_f$ would be 0.0035.

If the axial displacement in a cylindrical tube of radius R and half wavelength 1 is given by:

$$\alpha = \alpha_o \cos\frac{\pi x}{1} \cos \omega t$$

the axial velocity $$u = \frac{\partial \alpha}{\partial t},$$

the wall shear stress $$c_f \frac{\rho u^2}{2}$$

and the local instantaneous work rate $$c_f \frac{\rho u^3}{2}.$$

The average work rate W, integrated over the length of the tube and with respect to time, is:

$$W = \pi c_f \rho R 1 \omega^3 \alpha_o^3 \left[ \frac{2}{\pi} \int_0^{\frac{\pi}{2}} \cos^3\theta d\theta \cdot \frac{2}{\pi} \int_0^{\frac{\pi}{2}} \sin^3\phi \cdot d\phi \right]$$

Noting that the bracketed quantity is $$\frac{1}{\pi}\left(\frac{\Gamma(2)}{\Gamma(2.5)}\right)^2,$$

and evaluating the Gamma functions.

$$W = 0.566 \, c_f \rho R 1 \omega^3 \alpha_o^3 \quad (11)$$

$$= c_f A \frac{\rho u_1^3}{2}, \text{ where } u_1 = 0.565 u_o.$$

$u_o$ is the amplitude of axial velocity and A is total area of wall.

Expressed as a fraction $\eta$ of the maximum kinetic energy of the gas in the tube, the accumulation of friction work over a half stroke is:

$$\eta = \frac{0.72 \, \pi c_f \alpha}{R} \quad (12)$$

These considerations show that, although wall friction losses are a significant fraction of the developed mechanical power, they are containable particularly if the ogival shape is incorporated.

Characteristics of Regenerators

Regenerators have been used since Stirling cycle engines were first constructed, and it is accepted that they confer large increases of efficiency. Their function as thermal filters is to store heat acquired at one part of a reciprocating cycle as gas is passed during an adiabatic volume change, and to return it to the gas as the cycle is reversed. Their two essential properties are thus a large surface area exposed to the gas, coupled with a small thermal conductivity in the direction of gas motion. Typically they have the form of stacks of spaced non-metallic plates since these are efficient with regard to gas friction losses and heat transfer.

The beneficial use of regeneration in the present case may be seen from a plot of extreme values of adiabatic temperature change (FIG. 7) developed from the corresponding plot of density ratios in FIG. 5. The sloping lines in FIG. 7 quantitatively depict the paths taken by packets of gas undergoing adiabatic temperature changes, but in a reversible manner for simplicity, since in practice the lines would be loops acounting for heat transfer. The positions of regenerators 3 and 4 are shown, and it may be noted that these do not extend to the ends of the resonance tube where the heat transfer surfaces are placed. The gaps between are sufficient to avoid thermal contact.

The lines BB' and EE' represent gas packets which always remain within the regenerators. These packets pump heat against a temperature gradient by acquiring it when expanded and cold at positions towards the centre of the cavity, and releasing it by heat exchange when compressed and hot at positions towards the end of the cavity. Thus, there are temperature gradients within the regenerators, which slope up towards the ends of the cavity. The mean temperatures of the regenerators are also above ambient because heat exchange from compressed gas is more effective than from rarefied gas.

The most profound effect of the regenerators occurs at their ends near to the ends of the cavity, because in these positions gas enters when expanded and cold and receives heat. It leaves as it becomes compressed and hot, so that the mean temperature at the ends of the cavity is significantly raised. The effect may be traced with lines AA' and FF'. The reverse effect occurs at the inner ends of the regenerators, as seen from lines CC' and DD'. The overall effect is that mean temperatures are significantly raised by as much as half the temperature amplitude outboard of the regenerators, and lowered by a smaller amount over a larger volume inboard of the regenerators.

The regenerator length should exceed the gross displacement at the preferred location, and the gap between the lower regenerator and the heat absorber should be the practical minimum. An optimal criterion for the regenerator material is that the conductive heat penetration depth for each cycle should not exceed the strip thickness, and this is stated from the relevant transient heat flow treatment as:

$$t \sim 2\sqrt{\frac{2\alpha}{\omega}}. \tag{13}$$

For $t = 0.1$ mm and $\omega = 817$/sec, this indicates a preferred thermal diffusivity $\alpha$ approximately equal to $10^{-2}$ cm$^2$/sec, which would be satisfied by glassy materials. Metals are too conductive.

I claim:

1. A thermally driven gas resonance device comprising:

an elongate resonance tube (3), said resonance tube having an upper portion and a lower portion, said upper portion expanding in cross-section along its entire length from a first end thereof to a second end thereof;

a heat source (2), said heat source being located at said first end of said resonance tube; and, means for triggering oscillations in a gas in said resonance tube, wherein said resonance tube has a frusto-ogival shape and constantly expanding in cross-sectioned area along its entire length such that, when viewed along a longitudinal section thereof, side walls of said resonance tube are bowed outwardly over their entire length.

2. The gas resonance device of claim 1, wherein said heat source and said means to trigger said oscillations in said gas in said resonance tube are both formed by a pulsed heat source, said pulsed heat source having a pulse repetition frequency corresponding to a resonant frequency of said gas resonance tube.

3. The gas resonance device of claim 2, wherein said pulsed heat source also includes an indirect heater located at said one end of said resonance tube.

* * * * *